United States Patent [19]

Takenouchi et al.

[11] Patent Number: 5,201,625

[45] Date of Patent: Apr. 13, 1993

[54] CONNECTOR HOUSING OF THREADED CONNECTION TYPE HAVING SEALING MEMBER AND BOLT FOR SECURING THE HOUSING

[75] Inventors: Kenji Takenouchi; Makoto Yamanashi, both of Shizuoka, Japan

[73] Assignee: Yazaki Corporation, Tokyo, Japan

[21] Appl. No.: 886,810

[22] Filed: May 22, 1992

Related U.S. Application Data

[62] Division of Ser. No. 685,766, Apr. 16, 1991, Pat. No. 5,165,834.

[30] Foreign Application Priority Data

Apr. 23, 1990 [JP] Japan ................... 2-42490[U]

[51] Int. Cl.⁵ ................... F16B 33/00; F16B 43/02; H01R 13/627
[52] U.S. Cl. ................... 411/369; 411/424; 411/542; 411/544; 439/364
[58] Field of Search ................... 411/8–12, 411/366, 368, 369, 392, 424, 542, 544, 916, 551–553; 439/359, 361, 362, 364

[56] References Cited

U.S. PATENT DOCUMENTS

| | | |
|---|---|---|
| 2,430,623 | 11/1947 | Taylor, Jr. et al. . |
| 2,609,258 | 9/1952 | Taylor, Jr. et al. . |
| 2,678,585 | 5/1954 | Ellis . |
| 2,745,162 | 5/1956 | Zahodiakin ................... 411/551 |
| 3,519,279 | 7/1990 | Wagner . |
| 3,764,957 | 10/1973 | Iversen ................... 439/362 |
| 4,179,179 | 12/1979 | Lowden ................... 439/364 X |
| 4,280,390 | 7/1981 | Murray . |
| 4,310,164 | 1/1982 | Mesnel . |
| 4,522,541 | 6/1985 | Bidwell ................... 411/552 |
| 4,684,190 | 8/1987 | Clark et al. . |
| 4,712,802 | 12/1987 | Hewison et al. . |
| 4,975,008 | 12/1990 | Wagner . |
| 5,007,858 | 4/1991 | Daly et al. ................... 439/364 X |
| 5,100,336 | 3/1992 | Burgess et al. ................... 439/364 X |

Primary Examiner—Neill R. Wilson
Attorney, Agent, or Firm—Sughrue, Mion, Zinn, Macpeak & Seas

[57] ABSTRACT

A connector housing in which a pair of male and female connector housings are united together by tightening a bolt provided through a seal member on one of the male and female housings with a nut provided on the other one of the male and female housings, includes an externally-threaded portion formed on the bolt from its tip end by a predetermined length. A non-threaded portion is formed on the bolt, extending from the externally-threaded portion and having a diameter smaller than the externally threaded portion so that when the male and female connector housings are fittingly connected together completely, threaded engagement of the externally-threaded portion with the nut is released and the nut is disposed around the non-threaded portion. A pressing and retaining device presses and retains the bolt in a direction to contact the externally-threaded portion with the nut when the male and female connector housings are fittingly connected together completely.

4 Claims, 5 Drawing Sheets

CONNECTOR HOUSING OF THREADED CONNECTION TYPE HAVING SEALING MEMBER AND BOLT FOR SECURING THE HOUSING

This is a divisional of application Ser. No. 07/685,766 filed Apr. 16, 1991, now U.S. Pat. No. 5,165,834.

BACKGROUND OF THE INVENTION

This invention relates to a waterproof ring for a connector housing of the threaded connection type used, for example, for connecting automotive wiring.

The U.S. Pat. No. 4,684,190 discloses a conventional connector housing of the threaded connection type. Referring to FIGS. 1, 2 and 3, there is shown a seal electrical connector, which is disclosed in the U.S. Pat. No. 4,684,190, for use in, for example, a vehicle to connect an electrical engine harness with an electrical instrument harness through an aperture 1 in a bulkhead 2, with reference to FIGS. 2 and 3. The bulkhead 2 is used to separate the engine compartment, on the right hand side of the bulkhead, from the passenger compartment on the left hand side of the bulkhead with reference to these figures.

The electrical connector with sliding shroud assembly includes a male connector 10 and mating female connector 11, each of which has an inboard end thereof slidably received in a shroud 12.

Both of the male and female connectors 10 and 11, respectively, are provided with longitudinally extending apertures to receive a set of mating terminals 16 and 17, each of which is fixed to an electrical cable 16a and 17a, respectively, extending outward from the respective connectors, only one set of such terminals and cables being shown. Lock combs 18 and 18' are used to axially retain the terminals in their respective connectors A bolt 20, with an O-ring seal 21, extends through a bolt aperture 22 in the male connector 10 and is held captive therein by a bolt retainer 23, the threaded end of the bolt being adapted to be threaded into a T-nut 24 mounted in a nut receiving stepped aperture 25 provided for this purpose in the female connector 11.

The disclosed connector housing of the threaded type, however, suffers from problems in that, for example, it is likely to be broken due to an excessive tightening of the bolt 20. Also, the O-ring 21 provided for the water-proof property is subjected to torsion due to the friction between the O-ring 21 and the head of bolt 20. Further, the O-ring 21 is likely to be broken due to the excessive tightening of the bolt 20.

The present inventors Takenochi, et al. investigated the problem and invented threaded connection type connector housings shown in FIGS. 4 and 5 in order to reduce the above-mentioned problem in the threaded connection type connector housing.

The present invention was made to improve the connector housings shown in FIGS. 4 and 5. Therefore, the connector housings shown in FIGS. 4 and 5 will be described in detail in this background section for the purpose of clearly understanding the present invention.

FIG. 4 shows the threaded connection type connector housing, which is not a prior art of the present invention. A connector housing A is adapted to be fixedly secured to a panel P of a vehicle body, and has a nut A1 at its central portion. A detachable connector housing B has at its central portion a bolt B1 used for fittingly connecting the two connector housings A and B or for disconnecting them from each other.

In the connector housing B, a waterproof O-ring 103 is provided between an outer detachable member 101 (through which the bolt B1 extends) and a head 102 of the bolt B1. The O-ring 103 is subjected to torsion due to the friction between the O-ring 103 and the bolt head 102, which results in a drawback that the seal between the bolt B1 and the connector housing B is adversely affected.

On the other hand, in the connector housing of the threaded connection type, in order to avoid breakage of the connector housing due to an excessive tightening of the bolt, a narrower non-threaded portion 105 extending from an externally-threaded portion 104 is formed on the bolt B1. When the pair of connector housings are fittingly connected together completely, the threaded engagement of the externally-threaded portion 104 with the nut A1 is released (see FIG. 4). In order that the externally-threaded portion 104 in a non-threaded condition can be brought into threaded engagement with the nut A1 when the bolt B1 is rotated in a reverse direction so as to disconnect the connector housings from each other, a seal washer 106' and a pair of disk springs 106 are interposed between the head 102 of the bolt B1 and the connector housing B, thereby normally urging the bolt B1 in a direction of arrow X, as shown in FIG. 5.

However, this construction has a disadvantage that much time and labor are required for the connecting operation since the number of the component parts is large.

SUMMARY OF THE INVENTION

The present invention has been made in view of the above problems, and an object of the invention is to achieve both a sealing effect and a bolt-urging operation by a single member.

The above object has been achieved by a waterproof ring for a connector housing of the threaded connection type, characterized in that at least one spring member is mounted integrally in a seal ring of a soft rubber material having an insertion hole for passing a tightening bolt therethrough; each spring member having a generally U-shaped pressure-receiving bent portion directed in a direction of an axis of said bolt, and inner and outer pressing portions provided respectively on opposite sides of said pressure-receiving bent portion.

Further, the invention includes a connector housing having an externally-threaded portion formed on the bolt from its tip end by a predetermined length, a non-threaded portion formed on the bolt, extending from the externally-threaded portion and having a diameter smaller than the externally threaded portion so that when the male and female connector housings are fittingly connected together completely, threaded engagement of the externally-threaded portion with the nut is released and the nut is disposed around the non-threaded portion, and a device for pressing and retaining the bolt in a direction to contact the externally-threaded portion with the nut when the male and female connector housings are fittingly connected together completely.

DETAILED DESCRIPTION OF THE PREFERRED EMBODIMENTS

Figure 1:
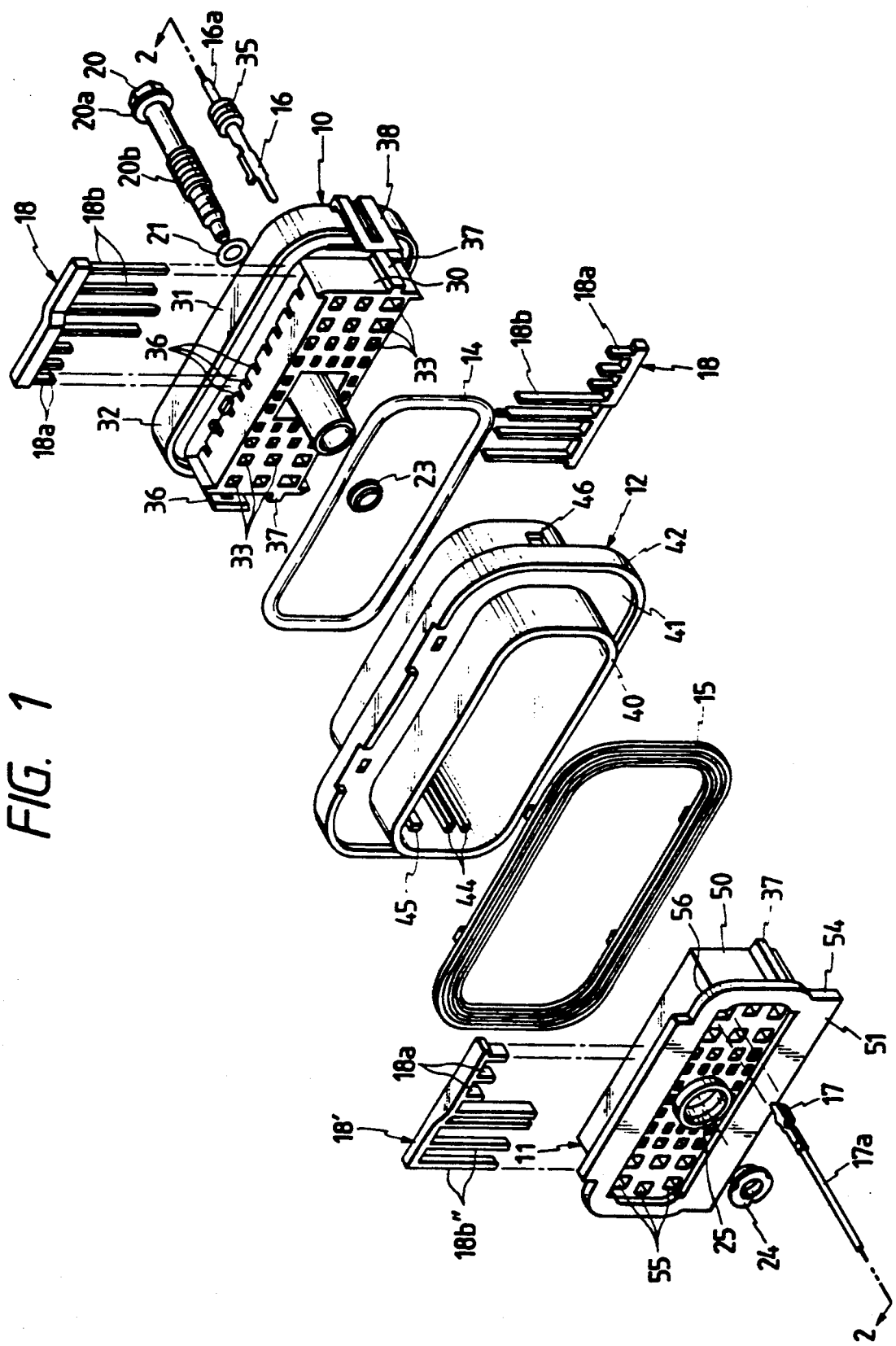
FIG. 1 is an exploded perspective view showing a conventional connector housing of a threaded connection type, which is disclosed in U.S. Pat. No. 4,684,190.
Figure 2:
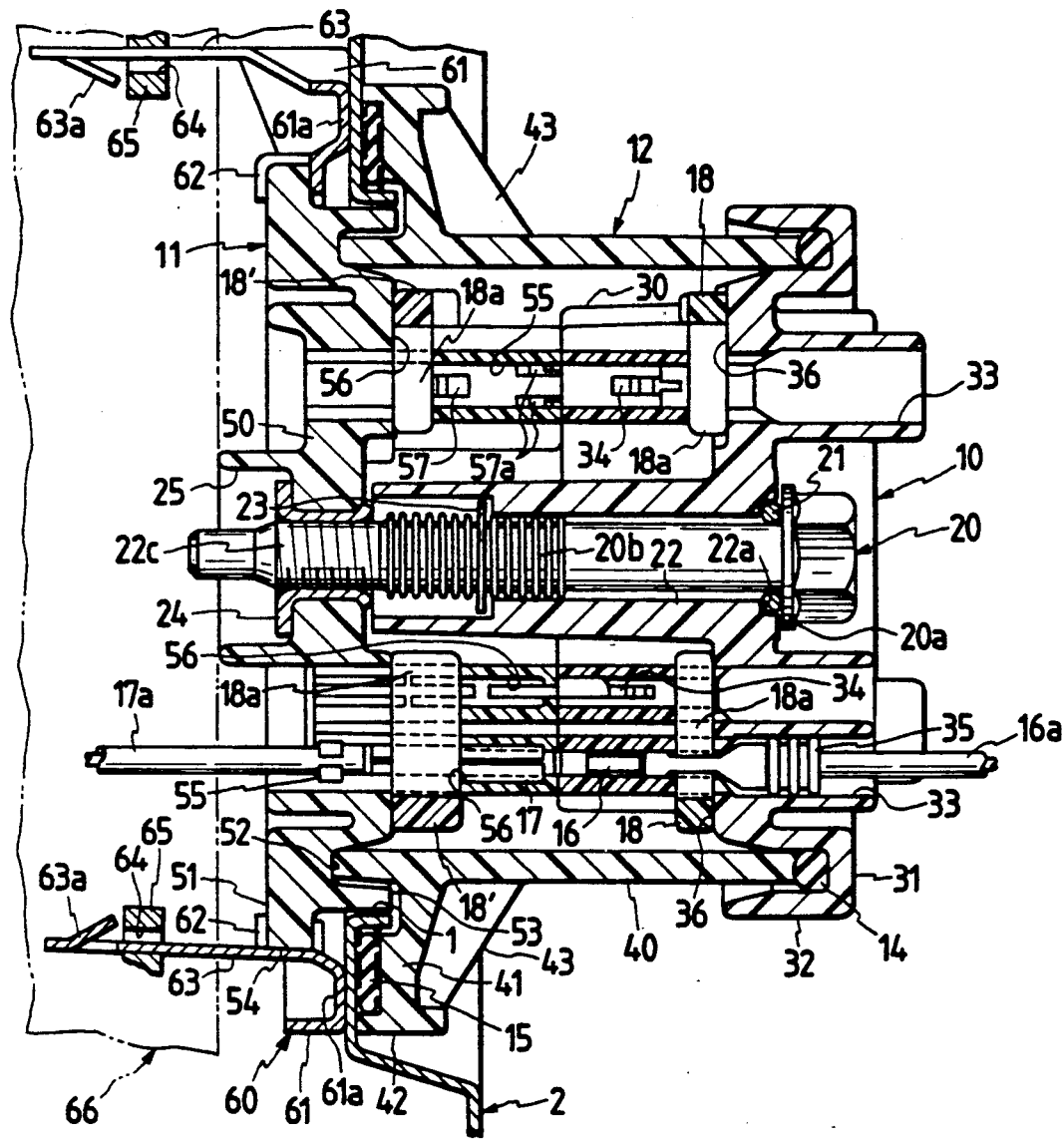
FIG. 2 is a cross-sectional view taken along substantially line 2—2 in FIG. 1.
Figure 3:
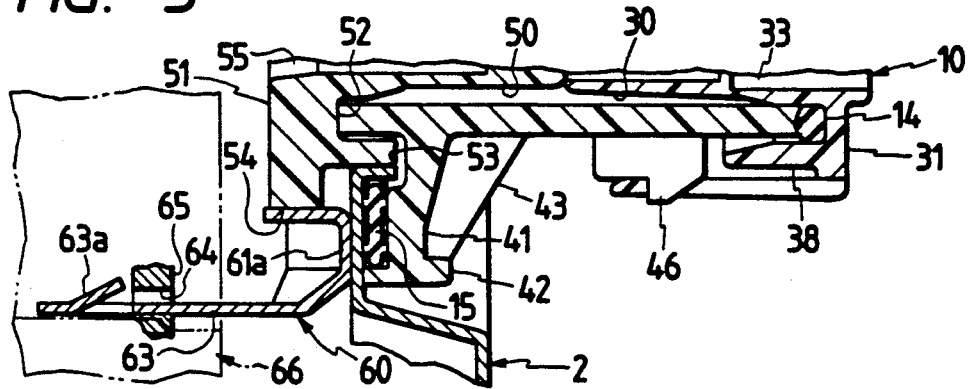
FIG. 3 is a sectional view of a portion of the assembly of FIG. 2.
Figure 4:
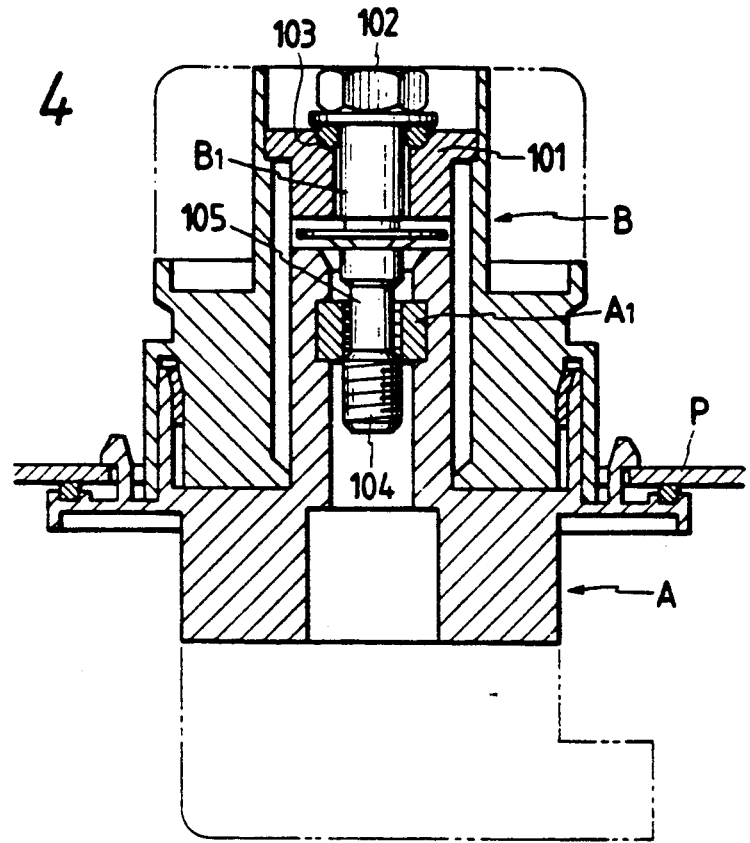
FIGS. 4 and 5 are cross-sectional views showing connector housings, which are not the prior art of the present invention.
Figure 5:
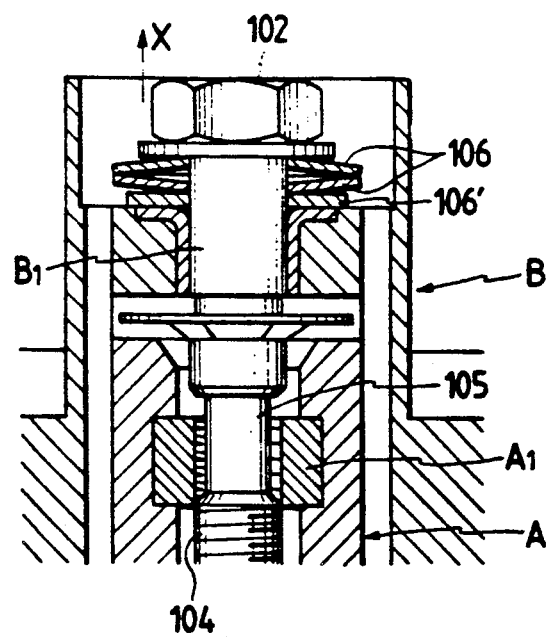
Figure 6:
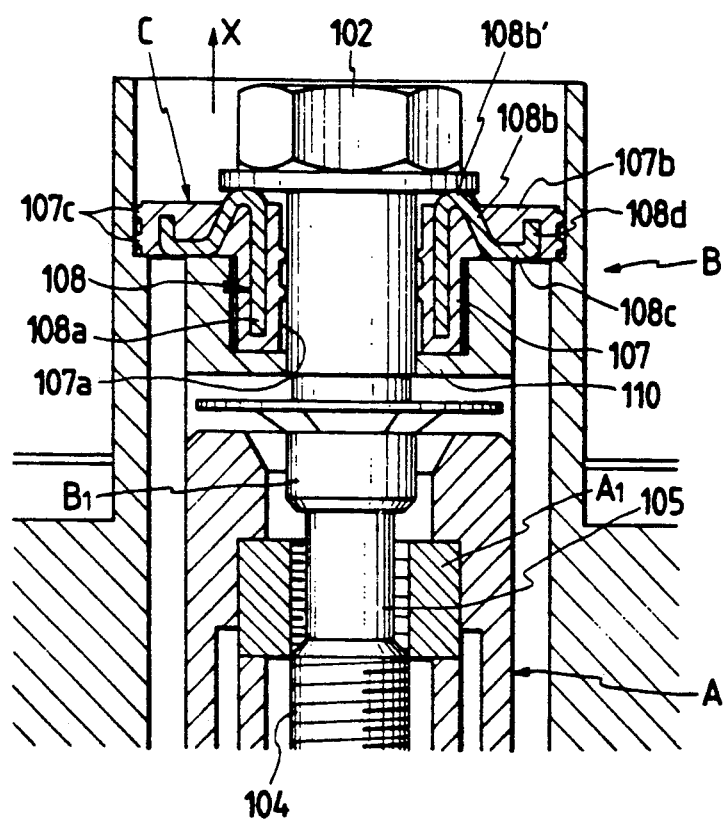
FIG. 6 is a cross-sectional view of a preferred embodiment of the present invention, showing the condition of use.

Referring to FIG. 6, as is the case with the connector housings shown in FIGS. 4 and 5, a connector housing A has a nut A1 at its central portion, and a connector housing B has a bolt B1 at its central portion. The bolt B1 has a head 102, an externally-threaded portion 104 and a narrower non-threaded portion 105.

A seal ring C is made of a relatively soft rubber material, and includes a tubular body 107 having a bolt insertion hole 107a, and an outwardly-directed flange 107b formed on one axial end of the tubular body 107. Annular ribs 107c are formed on the outer periphery of the flange 107b. Wire-like spring members 108 are integrally molded in the seal ring C, and are embedded therein.

The wire-like spring member 108 has an inner pressing portion 108a extending along the axis of the tubular body 107, a U-shaped pressure-receiving bent portion 108b directed in the direction of the axis of the bolt B1, an outer pressing portion 108c connected to the inner pressing portion 108a via the bent portion 108b and disposed in intersecting relation to the inner pressing portion 108a, and a bent piece 108d bent in the direction of the axis of the U-shaped pressure-receiving bent portion 108b. A top 108b' of the U-shaped pressure-receiving bent portion 108b is projected slightly beyond the seal ring C.

A plurality of wire-like spring members 108 are arranged at suitable intervals in the circumferential direction of the seal ring C.

In the above construction, when the bolt B1 is tightened, the wire-like spring member 108 is pressed through the top 108b' of the U-shaped pressure-receiving bent portion 108b, so that the inner pressing portion 108a is urged inwardly whereas the outer pressing portion 108c and the bent piece 108d are urged outwardly, thereby enhancing the sealing ability of the seal ring C. In this case, the head 102 of the bolt B1 receives a reaction from the wire-like spring members 108, and is urged in a direction of arrow X. Therefore, when the fitting engagement between the connector housings A and B is to be released, the bolt B1 and the nut A1 are instantly brought into threaded engagement with each other. Further, in the above tightened condition, the lower end of the tubular body 107 is pressed against a seal ring-receptive portion 110, thereby enhancing the sealing performance.

Figure 7:
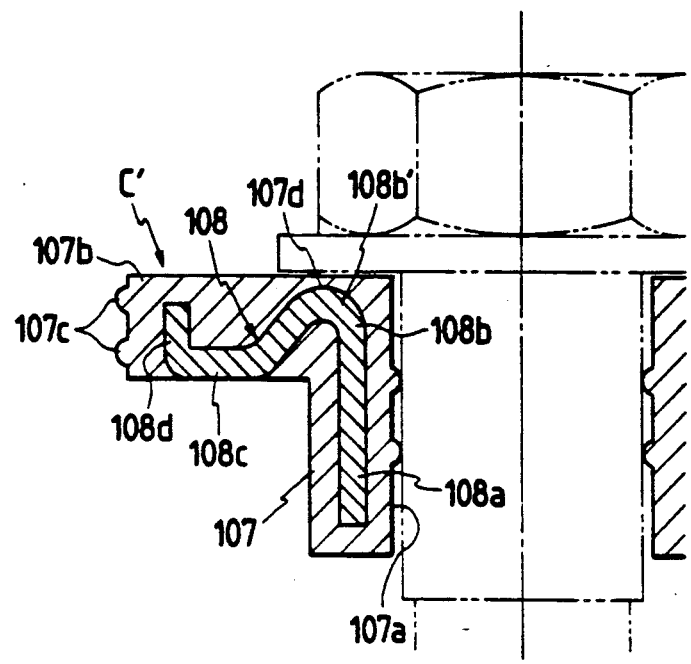
FIG. 7 is a cross-sectional view showing a modified seal ring of the invention; and, FIG. 8 is a cross-sectional view showing another modified seal ring of the invention.

In an embodiment shown in FIG. 7, each wire-like spring member 108 is integrally molded in a seal ring C', with a top 108b, of a U-shaped pressure-receiving bent portion 108b completely embedded in the seal ring C'. However, since a rubber layer 107d above the top 108b, is thin, a pressure-applying force by the bolt B1 can be sufficiently applied to the wire-like spring members 108.

Figure 8:
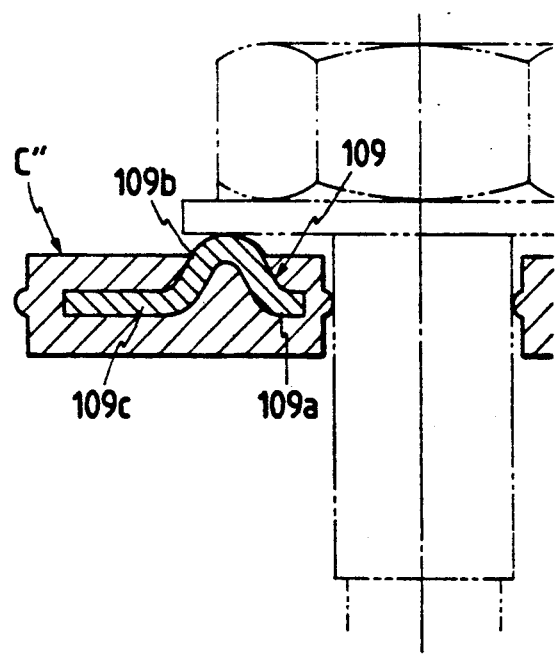

In an embodiment shown in FIG. 8, a seal ring C" has a relatively flat doughnut-shape, and a wire-like spring member 109 integrally molded therein has a U-shaped pressure-receiving bent portion 109b arranged in the axial direction, and inner and outer pressing portions 109a and 109c provided respectively on the inner and outer sides of the bent portion 109b in intersecting relation thereto.

In each embodiment, a plurality of the wire-like spring members are molded in the waterproof ring for pressing the tightening bolt. However, the present invention should not be restricted thereto or thereby. For example, it is possible to use, in place of the plural spring members, one cylindrical member or one relatively flat doughnut-shaped member having the same cross-sectional shape shown in one of FIGS. 6, 7 and 8.

As described above, in the present invention, the spring members are mounted integrally in the seal ring of a soft rubber material having the insertion hole for passing the tightening bolt therethrough, and each of the spring members has the generally U-shaped pressure-receiving bent portion directed in the direction of the axis of the bolt, and the inner and outer pressing portions provided respectively on the opposite sides of the pressure-receiving bent portion. Therefore, the single seal ring can achieve not only the sealing effect but also the bolt-urging operation when tightening the bolt, thus providing advantages such as an improved sealing effect over the prior art, and an easier connection.

What is claimed is:

1. A connector housing in which a pair of male and female connector housings are united together by tightening a bolt provided through a seal member on one of said male and female housings with a nut provided on the other one of said male and female housings, said connector housing comprising:

an externally-threaded portion formed on said bolt from its tip end by a predetermined length;

a non-threaded portion formed on said bolt, extending from said externally-threaded portion and having a smaller diameter than said externally-threaded portion so that when said male and female connector housings are fittingly connected together completely, threaded engagement of said externally-threaded portion with said nut is released and said nut is disposed around said non-threaded portion; and means for pressing and retaining said bolt in a direction to contact said externally-threaded portion with said nut when said male and female connector housings are fittingly connected together completely.

2. The connector housing according to claim 1, wherein said pressing and retaining means includes a plurality of wire-like spring members mounted integrally in said seal member, said seal member comprising soft rubber material.

3. The connector housing according to claim 1, wherein said pressing and retaining means includes a cylindrical member mounted integrally in said seal member, said seal member comprising soft rubber material.

4. The connector housing according to claim 1, wherein said pressing and retaining means includes a substantially flat doughnut-shaped member mounted integrally in said seal member, said seal member comprising soft rubber material.

* * * * *